United States Patent [19]

Hairston et al.

[11] 4,443,030
[45] Apr. 17, 1984

[54] BALL JOINT

[75] Inventors: Hannon S. Hairston, Daphne; M. E. Hanrath, Mobile, both of Ala.

[73] Assignee: Mobile Pulley & Machine Works (A division of Lehigh Valley Industries, Inc.), Mobile, Ala.

[21] Appl. No.: 318,145

[22] Filed: Nov. 4, 1981

[51] Int. Cl.³ ..................... F16L 27/04; F16L 55/00
[52] U.S. Cl. ......................................... 285/263; 285/55
[58] Field of Search .................... 285/261, 263, 55

[56] References Cited

U.S. PATENT DOCUMENTS

| 1,475,090 | 11/1923 | Taylor | 285/261 |
| 3,165,339 | 1/1965 | Faccou | 285/263 |
| 3,712,645 | 1/1973 | Herter | 285/95 |
| 4,139,221 | 2/1979 | Shotbolt | 285/18 |

FOREIGN PATENT DOCUMENTS 2068489 8/1981 United Kingdom .

Primary Examiner—Richard J. Scanlan, Jr.
Attorney, Agent, or Firm—Stephen P. Gilbert

[57] ABSTRACT

A ball joint having a gland liner free to rotate with respect to both the gland and the ball is disclosed.

6 Claims, 4 Drawing Figures

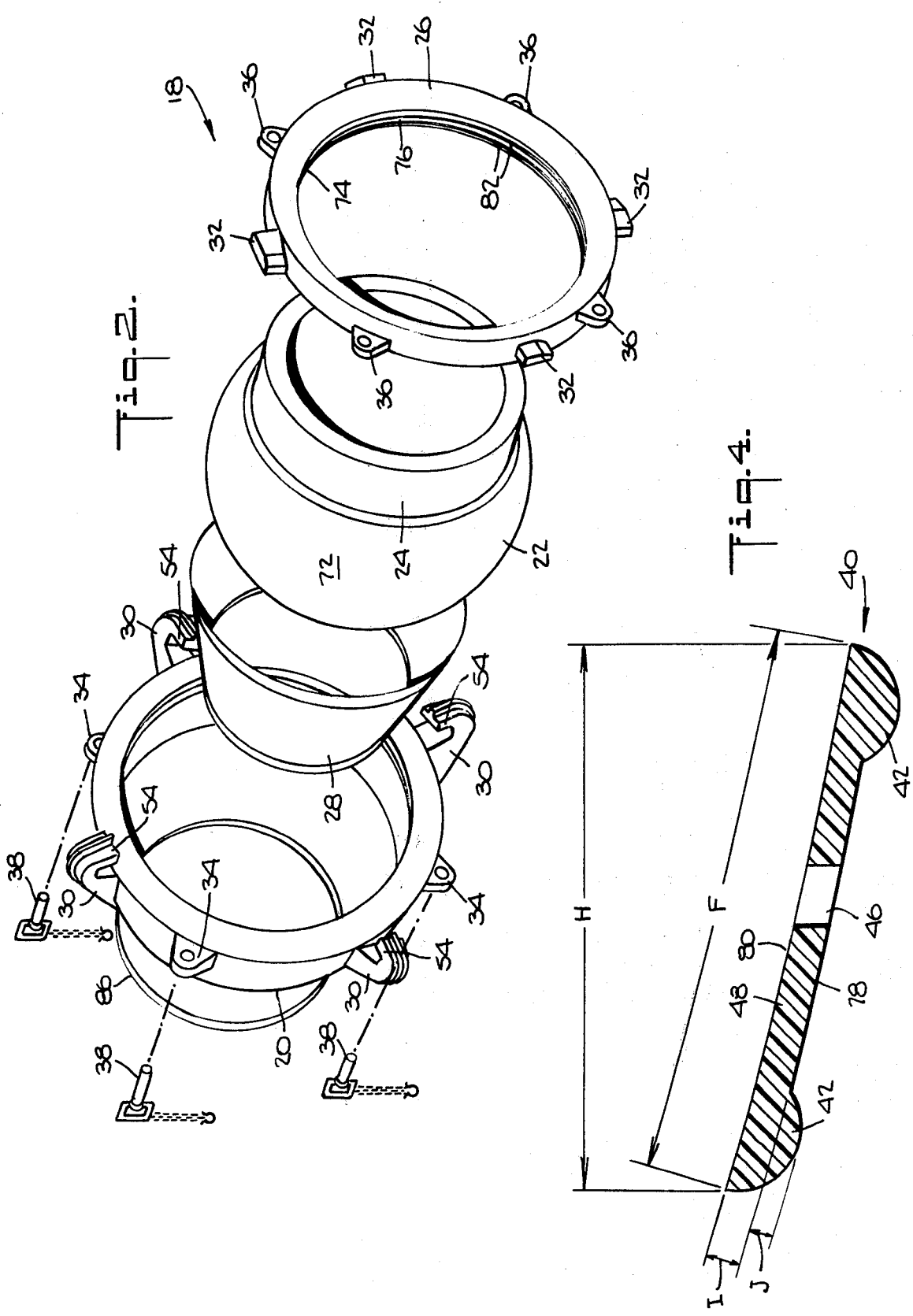

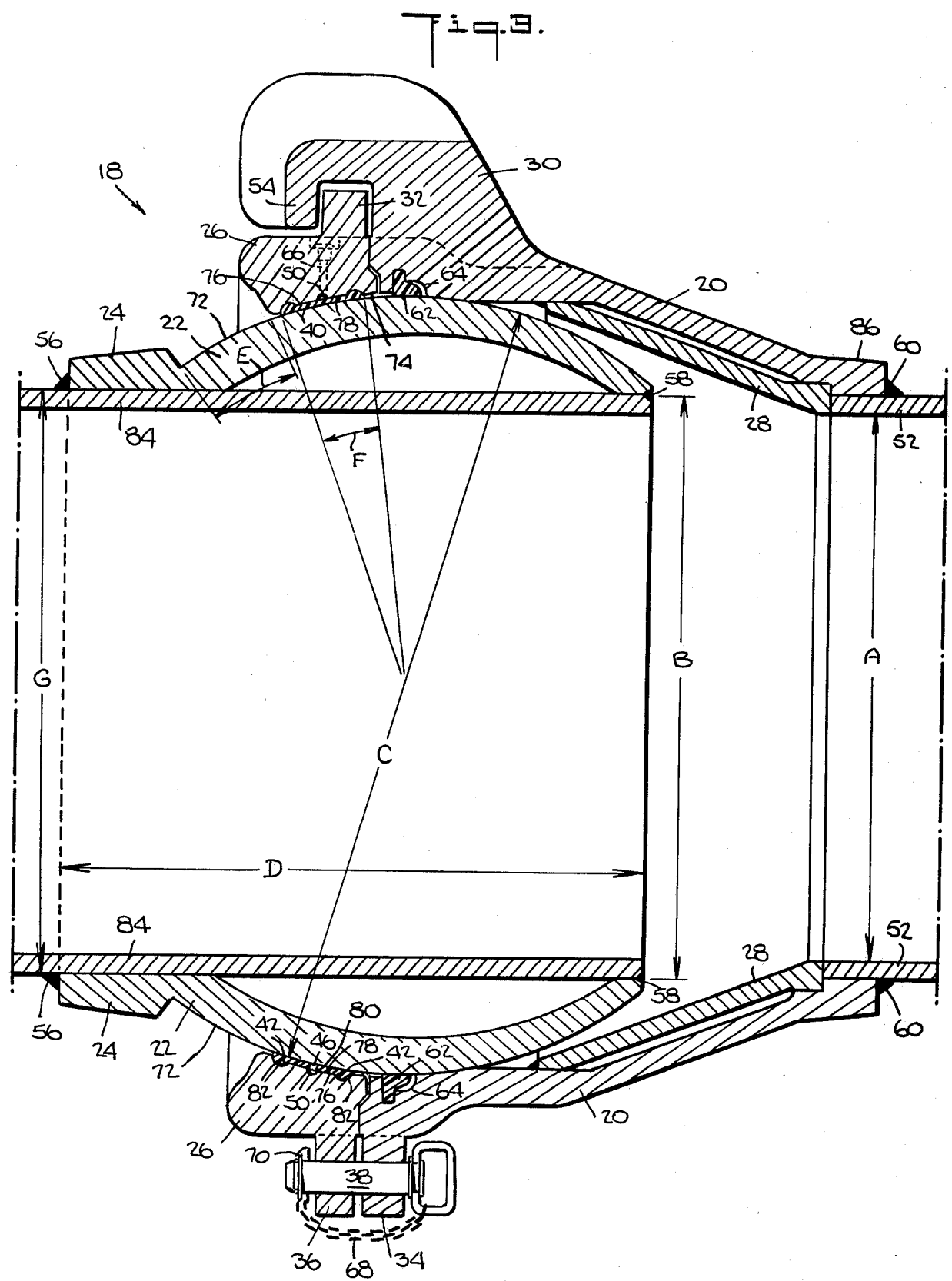

BALL JOINT

BACKGROUND OF THE INVENTION

This invention relates to ball joints. Ball joints are used to connect pipe sections so that the pipe sections are free to move with respect to one another.

A ball joint consists of three major parts: a case having a concavity, a so-called "ball" (actually a frustum of a hollow sphere), which fits closely within the concavity so as to form a fluid seal, and a gland (or gland ring) that urges the ball into the concavity so as to maintain the seal. Pipes attached to the ball and case are, thus, fluidly connected but can move with respect to each other.

Ball joints find particular application in dredging operations. Typically, the pipeline running from the dredge to the dump site rides on floats so that the pipeline is above the water or is partially submerged in the water. Obviously, wave action and other forces on the pipeline require that the pipe sections be free to move. These forces plus the constant wetting, high internal pressure, and presence of abrasive material (e.g., dredged sand) result in wear of the ball joint, including the gland.

Because of high operating pressures inside the pipelines, which may be several hundred pounds per square inch, a ball in a ball joint in such a pipeline is forced away from its case and against its gland. Movement of the ball (caused by movement of the pipeline) against the inner surface of the gland in contact with the ball results in accelerated wear of the inner surface of the gland.

One attempted solution to the problem was to construct a liner for the gland by placing pieces of abrasion-resistant urethane in a circumferential groove in the inner surface of the gland. These pieces were held in place by screws so that they could not move. The pieces were forced to assume the shape of the groove (i.e., mate with the groove) when the ball compressed them against the gland.

Although it resulted in reducing the bending moment required to swivel the ball, this attempted solution suffered from many disadvantages. First, it is difficult, time-consuming, and, thus, expensive to replace such a liner. Second, the liner cannot rotate within the gland during use and thereby even out the wear on it, which would prolong the liner's life.

Also known for many years in the ball joint art is a gland configuration wherein the gland contains a circumferential passageway. During use, water is pumped into the passageway and leaves through holes in a circumferential plate that forms the circumferential side of the passageway closest to the ball. The water leaving through the holes forms a thin layer of water between the gland and the ball, thereby providing lubrication between the ball and gland. The plate itself does not move within the gland nor does it itself facilitate the movement of the ball.

SUMMARY OF THE INVENTION

An improved ball joint having none of the disadvantages described above and offering additional advantages to be described below has now been developed. Broadly, the new ball joint of this invention comprises:
(a) a case;
(b) a ball;
(c) a gland rotatably securing at least part of the ball within the case, said gland having a circumferential groove on its inner surface; and
(d) a gland liner having a first surface, which circumferentially slidably engages the groove of the gland, and a second surface, which slidably engages the outer surface of the ball, wherein the gland liner is free to travel circumferentially within the groove with respect to both the gland and the ball.

In another aspect, a combination of the present invention comprises:
(a) a gland for a ball joint, said gland having an inner surface that generally conforms to the outer surface of the ball of the ball joint; said inner surface having a circumferential groove; and
(b) a gland liner having a first surface, which circumferentially slidably engages the groove of the gland, and a second surface, which slidably engages the outer surface of the ball of the ball joint, said gland liner being free to travel circumferentially within the groove.

BRIEF DESCRIPTION OF THE DRAWINGS

To facilitate further description of the invention, the following drawings are provided in which:

FIG. 2 is an exploded view of a typical ball joint in accordance with the present invention;

FIG. 3 is a cross-sectional view of a ball joint in accordance with the present invention; and FIG. 4 is a cross-sectional view of a preferred gland liner in accordance with the present invention.

Figure 1:
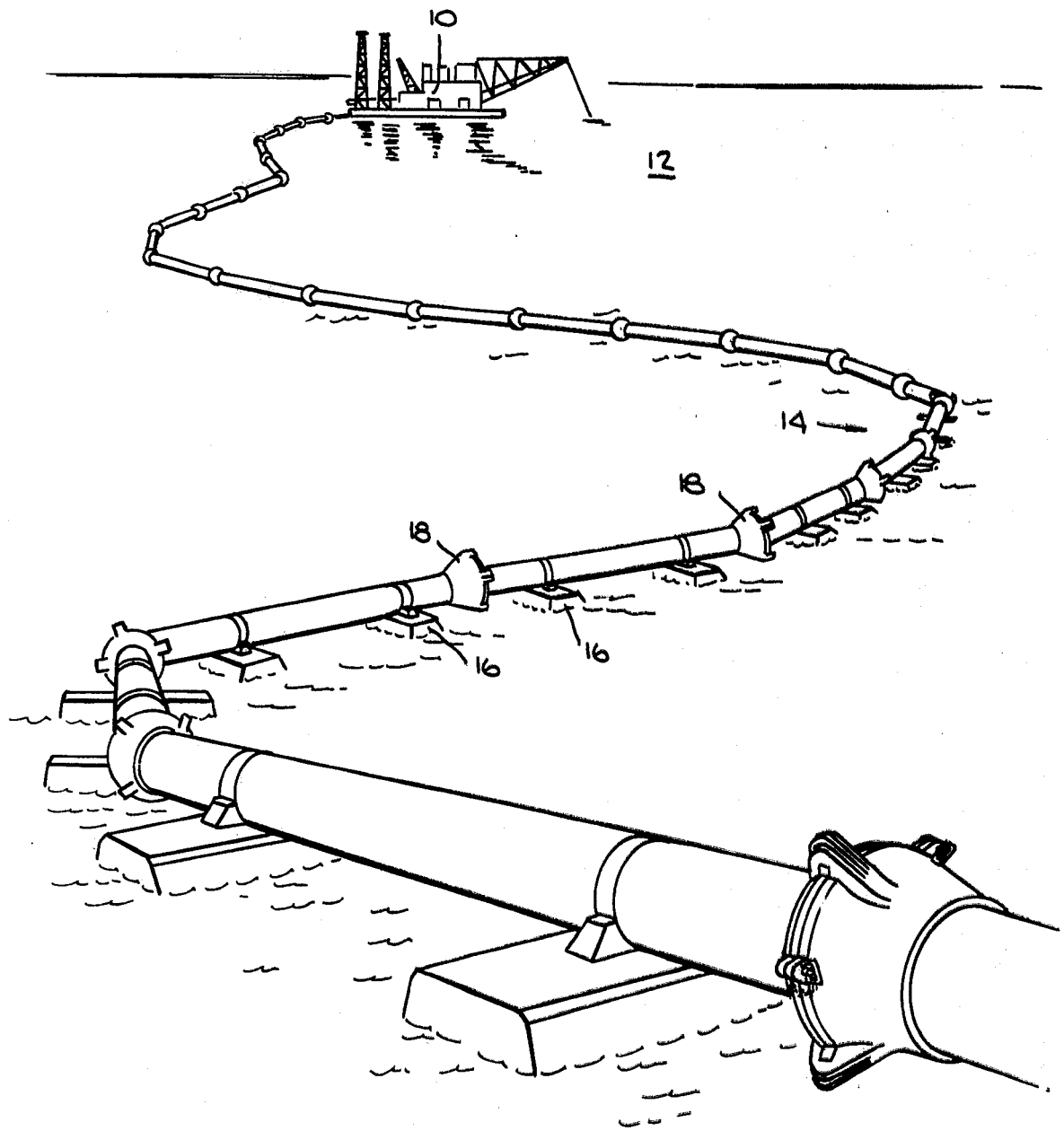
FIG. 1 shows a typical dredging operation.

It should be understood that these drawings are for illustrative purposes only and should not be construed to limit the scope of the claims.

DETAILED DESCRIPTION OF THE INVENTION

In FIG. 1, dredging vessel 10 is dredging the earth under body of water 12. The earth removed is sent in the form of a slurry through dredge pipeline 14 to the site for dumping. The pipeline sections ride on floats 16 and are connected by ball joints 18.

FIG. 2 is an exploded view of ball joint 18 comprising case 20, case liner 28, ball 22, and gland 26. The gland liner of this invention (not shown) fits into groove 76 in inner circumferential surface 74 of gland 26. The pipe connected to ball 22 (see FIG. 3) is attached at ball collar 24. The pipe connected to case 20 is attached at case end 86.

Case liner 28 is normally attached to the inside of case 20 by welding. To assemble the ball joint, ball 22 and case 20, each having its respective pipeline attached, are brought together as far as possible so that ball 22 is at least partially within case 20. Gland 26 is then moved as far as possible towards case 20 so that gland inner surface 74 is near ball 22. At this point gland liner 40 contacts ball 22 (see FIG. 3).

To lock the assembly together, gland 26 is rotated to place locking lugs 32 on gland 26 within the corresponding portions of ears 30 on case 20. This also aligns each locking pin lug 36 on gland 26 with its respective locking pin lug 34 on case 20. To prevent further rotation of the gland (and concomitant disassembly), one or more locking pins 38 are inserted through the matching holes of corresponding lugs 34 and 36. Usually, only one locking pin is used, placed in the most convenient pair of lugs to reach, which normally is the pair closest to the surface of the water.

In FIG. 3, pipe 52 is welded at circumferential weld bead 60 to end 86 of case 20 and pipe 84 is welded at circumferential weld beads 56 and 58 to collar 24 and ball 22, respectively. Liner 28 is welded within case 20. Ball 22 is free to rotate and swivel within case 20, thereby fluidly connecting pipe 84 to pipe 52. Fluid normally flows through pipe 84 into pipe 52 and case liner 28 protects the inside of case 20 from the impinging fluid when ball 22 is swivelled from the position shown, i.e., when the axes of pipes 84 and 52 do not coincide.

Locking lug 32 is within locking ear 30, and pin 38, which passes through the aligned holes of matching lugs 34 and 36, prevents rotation of gland 26 with respect to case 20. Standard locking pin 38 has its own lock 70 to prevent the pin itself from falling out of lugs 34 and 36. Lock 70 is attached to pin 38 by chain 68. Gasket 62, within circumferential groove 64 in case 20, prevents material in the pipeline from flowing between case 20 and ball 22 and out of the ball joint. The preferred gasket material is Buna-N rubber having a durometer hardness of 70 on the A scale.

Gland 26 has inner surface 74, which generally conforms to outer surface 72 of ball 22. Both surfaces are spherical and, typically, differ in diameter by approximately six millimeters so that the gland liner will preferentially wear instead of the gland.

Gland liner 40 has first surface 78, which slidably engages groove 76 on gland inner surface 74. Groove 76 itself has two circumferential grooves (or concavities) 82. Circumferential rings (or convexities) 42, at opposite ends of first surface 78, identically match and matingly engage concavities 82.

Second surface 80 of gland liner 40 is spherical and closely fits and rides on (slidably engages) outer surface 72 of ball 22 so that there is essentially no clearance between the gland liner and the ball.

As explained above, the typical high operating pressures in prior art ball joints force the ball against the gland. Similarly, during use of ball joint 18 of this invention, high internal operating pressures force ball 22 tightly against second surface 80 of gland liner 40. That in turn forces gland 26 to the left (see FIG. 3), thereby forcing lugs 32 against portions 54 of ears 30.

Gland 26 also contains circumferential groove 50; however, no part of liner 40 fits within (matingly engages) that groove. Instead, groove 50 normally is filled with grease supplied by means of standard, Alemite-type grease fittings 66, which terminate at their inner ends at groove 50. Lubricant in channel 50 also passes through grease holes 46 in liner 40 so as to lubricate outer surface 72 of ball 22 and second surface 80 of liner 40.

FIG. 4 is an enlarged cross-sectional view of liner 40 showing the preferred double-knuckle (or double-hump) configuration. For a nominal 750 mm-size ball joint, dimensions A to J in FIGS. 3 and 4 preferably have the following sizes (approximately):

| Dimension Line | Size |
| --- | --- |
| A | 760 mm |
| B (inner diameter of collar 24) | 805 mm |
| C | 1,067 mm |
| D | 800 mm |
| E | 15 degrees |
| F | 12.5 degrees |
| G (outer diameter of pipe 84) | 800 mm |
| H | 113 mm |
| I | 6.4 mm |
| J | 6.4 mm |

Additionally, this liner preferably has eight grease holes 46, each approximately 12.7 mm in diameter.

The liner should be made of a material that has a low coefficient of friction and good elastic memory characteristics and is tough, resilient, impact resistant, abrasion resistant, and chemically and thermally stable. Adiprene ® (trademark of E. I. du Pont de Nemours and Co.) urethane having a durometer hardness of 75 on the D scale compounded with 5% (by volume) molybdenum disulfide has been found to be suitable as well as Gallagher Corporation (Gurnee, Ill., U.S.A.) Compound GC-1575 compounded with 5% (by volume) molybdenum disulfide.

In the ball joint of this invention, replacement of the gland liner is greatly simplified. Locking pin or pins 38 are removed and gland 26 is rotated to free lugs 32 from ears 30. When freed, gland 26 is pulled away from case 20. The liner is pulled free from groove 76 in gland 26 and severed. The cut liner is then removed. To install a new liner, if the ball is attached to its pipe the new liner is cut once transversely, pulled apart temporarily, and placed into groove 76.

If the ball is not attached to the pipe, the new gland liner need not be cut. Whether the new liner is cut or not, the new liner is snapped into its groove and once in place will not fall out. That is due primarily to the stiffness and hardness of the liner and the configuration of the liner and its groove.

The present invention is of enormous economic value. With this invention the ball does not have to be unwelded from its pipe to change liners nor does the ball have to be rewelded to its pipe afterwards. In contrast, in prior art ball joints without liners, unwelding and rewelding of the ball to its pipe are necessary because otherwise the gland cannot be replaced. Furthermore, even under the best conditions, prior art glands must be replaced several times during the life of the ball joint. With the present invention, however, the gland liner is sacrificially worn instead of the gland, thereby reducing the frequency of or entirely obviating gland replacement. Additionally, because of the friction-reducing properties of the preferred urethane-molybdenum disulfide liner, lubrication is not critical. That is in contrast to currently used ball joints, in which lubrication is critical and must be added regularly.

The present invention provides still other benefits. Because the liner is free to rotate with respect to both the gland and the ball, wear on the assembly is reduced and the bending moment required to swivel the ball within the gland is reduced, thereby decreasing the chances of the pipes or joints being damaged. Rotation and swiveling of the liner also distribute the molybdenum disulfide, which compound is believed to inhibit corrosion on the outside of the ball.

The preferred liner configuration (shown in FIG. 4) has several advantages. First, the loaded area is greater than that of a similar but rectangular cross-section liner. That decreases the load on any one part of the liner and reduces wear. Second, the liner is thicker at the point of maximum wear (the left convex or ring portion 42 on liner 40 in FIG. 3). Third, the two convex or ring portions 42 stiffen the liner. That is important in helping the liner return to its original spherical shape if it is deformed during storage. Finally, because of the higher shape factor (area of one loaded surface divided by the total area free to bulge during compression), the gland liner can handle high loads without suffering permanent deformation.

Variations and modifications will be obvious to one skilled in the art and the claims are intended to cover all variations and modifications that fall within the true spirit and scope of the invention.

We claim:

1. A ball joint particularly useful in dredging operations and attached to pipe floating at or near the surface of water, said ball joint comprising:
   (a) a case attached to the end of a first pipe;
   (b) a ball attached to the end of a second pipe;
   (c) a gland rotatably securing at least part of the ball within the case, said gland having a first wider circumferential groove on its inner surface with at least one narrower circumferential groove in the first wider groove; and
   (d) an elastic, resilient gland liner having a first surface that circumferentially slidably engages the first groove of the gland and a second surface that slidably engages the outer surface of the ball, said first surface having at least one stiffening circumferential convex rib that slidably and matingly engages the at least one narrower circumferential groove in the gland;
   wherein (e) the gland liner is free to travel circumferentially within the grooves with respect to both the gland and the ball; (f) the ball joint floats above or near the surface of the water and the ball and case are free to swivel and to rotate axially with respect to one another in response to wave action; and (g) the liner is able to be quickly removed from the gland and replaced without detaching the case or ball from the first or second pipe, respectively.

2. The ball joint of claim 1 wherein the liner is made of approximately 95%w urethane and approximately 5%w molybdenum disulfide.

3. The ball joint of claim 1 wherein the gland has two narrower circumferential grooves in the first wider groove and the liner has two circumferential convex ribs that slidably engage the two narrower grooves, one of the ribs being located at the circumferential edge of the liner that is subject to the greater wear of the two circumferential edges.

4. The ball joint of claim 3 wherein the liner is made of approximately 95%w urethane and approximately 5%w molybdenum disulfide.

5. The ball joint of claim 1 further comprising means for feeding lubricant to the liner.

6. The ball joint of claim 5 wherein the liner is made of approximately 95%w urethane and approximately 5%w molybdenum disulfide.

* * * * *